Jan. 9, 1951         A. J. LEVIN         2,537,143

VARIABLE BUOYANCY LIFT

Filed March 10, 1948         3 Sheets-Sheet 1

INVENTOR.
ABRAHAM J. LEVIN.
BY
Robert A. Sloman
ATTORNEY.

Jan. 9, 1951 A. J. LEVIN 2,537,143
VARIABLE BUOYANCY LIFT
Filed March 10, 1948 3 Sheets-Sheet 2
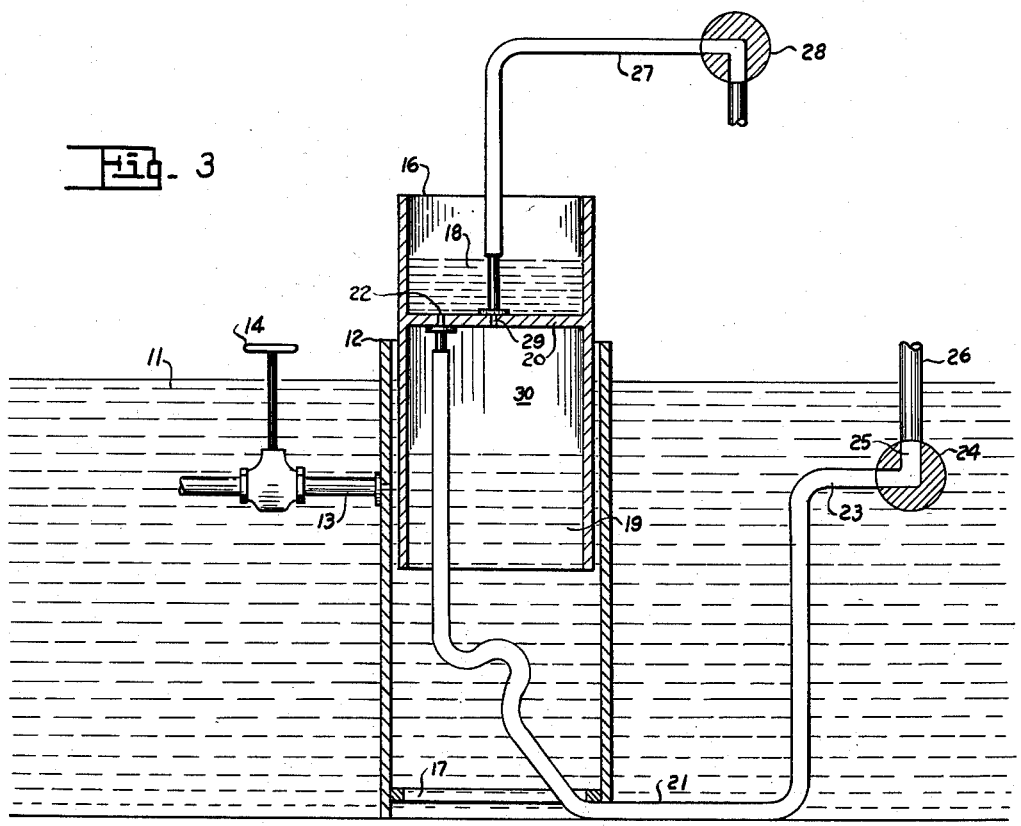
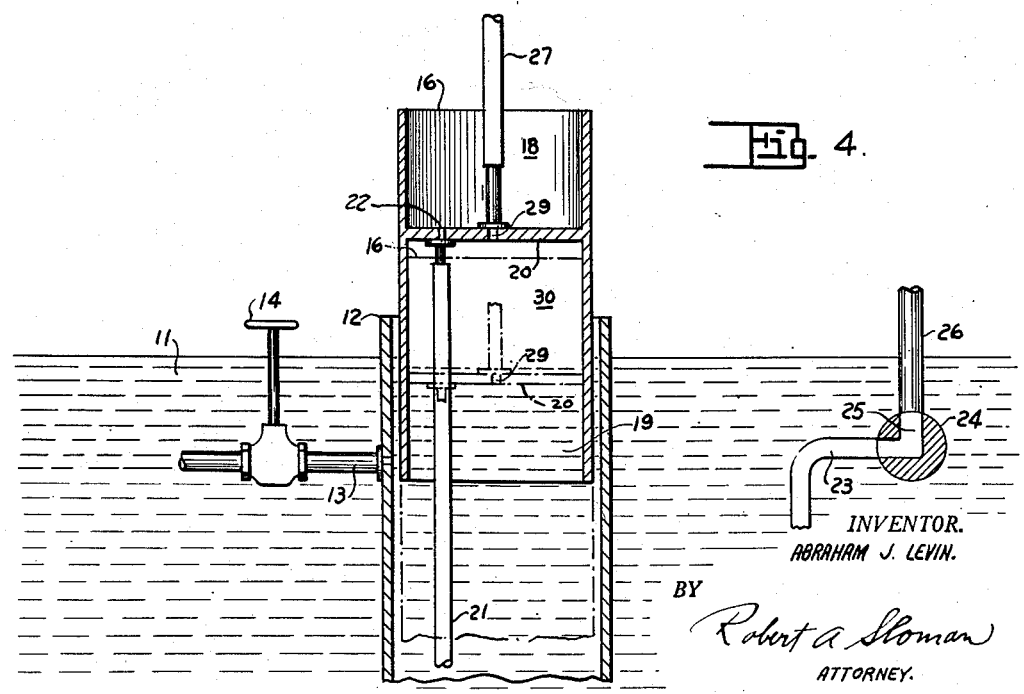
INVENTOR.
ABRAHAM J. LEVIN.
BY
Robert A. Sloman
ATTORNEY.

Jan. 9, 1951   A. J. LEVIN   2,537,143
VARIABLE BUOYANCY LIFT
Filed March 10, 1948   3 Sheets-Sheet 3
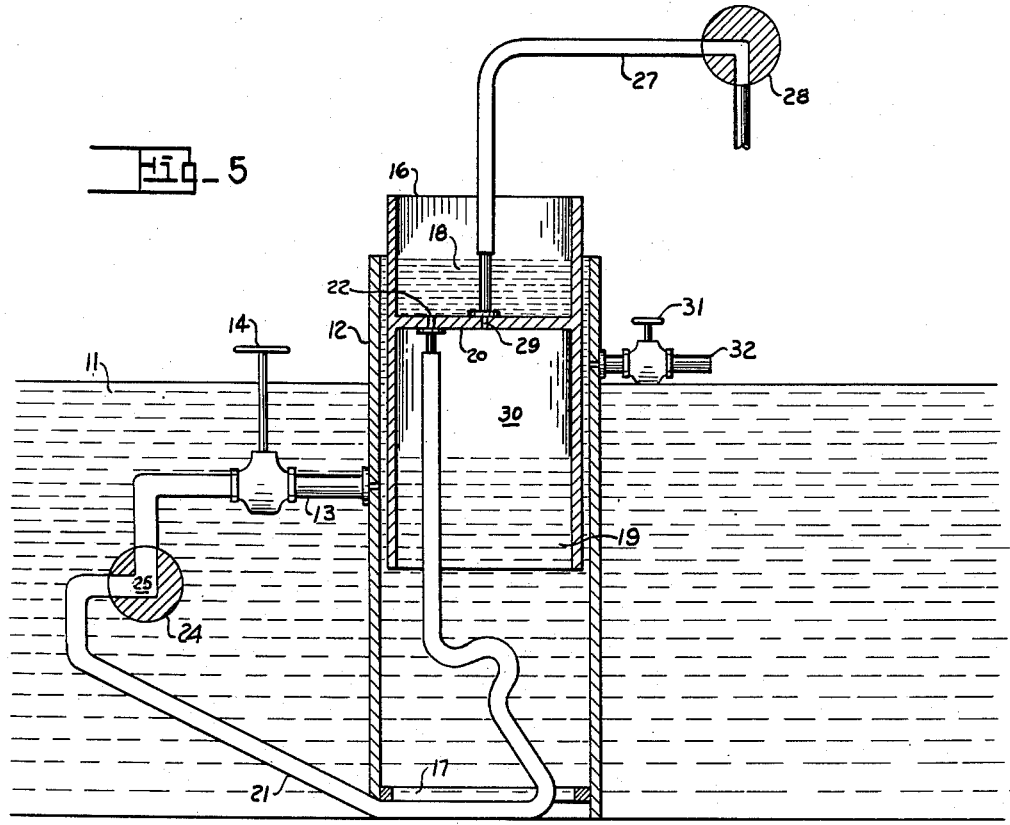
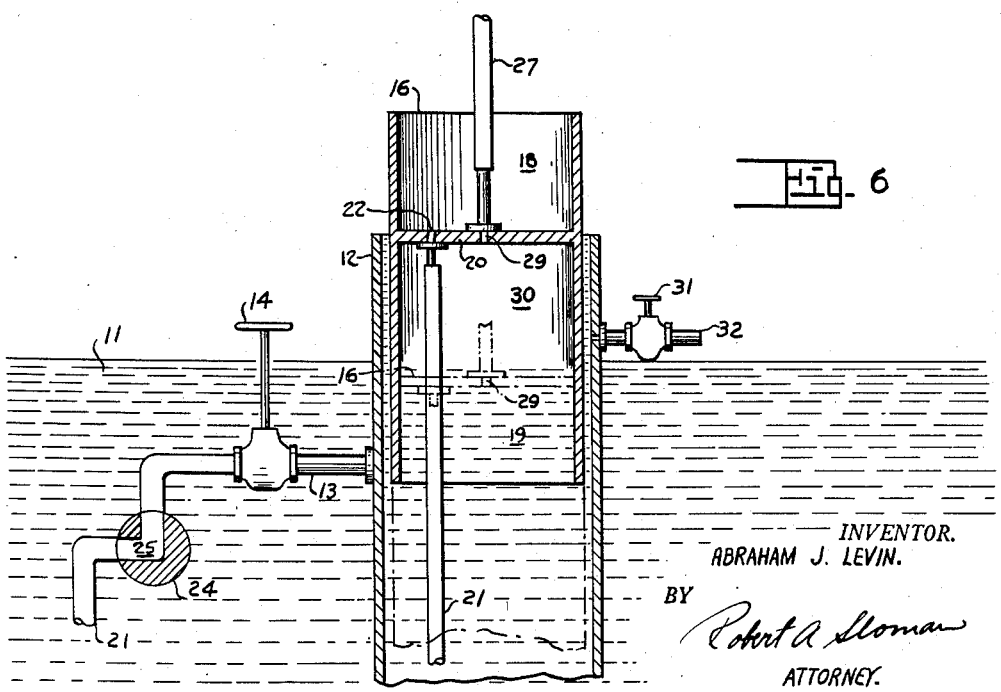
INVENTOR.
ABRAHAM J. LEVIN.
BY
ATTORNEY.

Patented Jan. 9, 1951

2,537,143

UNITED STATES PATENT OFFICE 2,537,143

VARIABLE BUOYANCY LIFT

Abraham J. Levin, Franklin, Mich.

Application March 10, 1948, Serial No. 14,087

6 Claims. (Cl. 103—56)

This invention relates to a means for producing a mechanical movement, and more particularly to a fluid mechanism for producing mechanical movements.

It is the principal object of this invention to provide structures adapted to utilize the reserve buoyance of objects partially or wholly immersed within a fluid.

It is the further object of this invention to provide a means for regulating and increasing such reserve buoyancy whereby the latter may be employed to do useful work as in the transmission or transportation of fluids from one point to another.

It is the further object of this invention to provide a novel construction for utilizing such reserve buoyancy as may be created to thereby provide an effective means of supplying fluid for irrigation purposes at points remote from the source of fluid.

It is the further object of this invention to provide means for creating or increasing the reserve buoyancy of a fluid container to thereby elevate the same relative to the source of fluid artificially creating a fluid pressure head which is available for any number of purposes, as for instance for use in supplying fluid for irrigation, or for hydro-dynamic purposes.

It is the still further object of this invention to provide a hollow or other construction adapted for immersion in a fluid together with means for controlling and regulating the reserve buoyancy of said construction and thereby controlling up and down movements of said construction when immersed or partially immersed in a fluid such as water.

These and many other objects will be seen from the following specifications and claims in conjunction with the appended drawings in which:

Figure 3 is a similar view illustrating the relative position of the elements under a further change of conditions.

Figure 4 is a similar view illustrating the relative position of the elements under a further change of conditions.

Figure 5 is a similar view illustrating a slight variation of the present invention; and Figure 6 is a similar view illustrating the relative position of the respective elements under a change of conditions.

Figure 1:
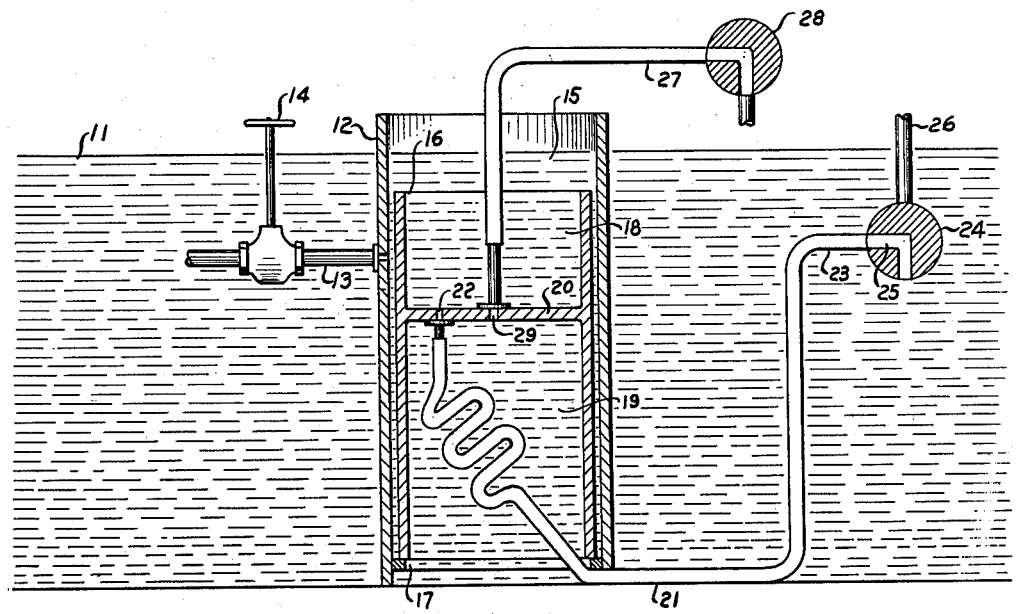
Figure 1 is a partially diagrammatic elevational section of one embodiment of the present invention.

It will be understood that the above drawings illustrate merely a preferable embodiment of the invention by way of illustration only, and that other embodiments are contemplated within the scope of the claims hereafter set out.

Referring to the drawings a body of fluid 11 such as water is shown within which is submerged substantially the upright hollow cylindrical container or housing 12 which is preferably open at its opposite ends.

Fluid inlet pipe 13 with hand valve 14 is joined to housing 12 below the water level for communication with the interior thereof, whereby with said valve open the fluid 15 within housing 12 will assume the level of fluid 11 on the exterior of said housing.

A second substantially hollow housing, 16 preferably open ended is coaxially positioned within housing 12, being submerged therein as shown in Figure 1, with its lower edge bearing upon the annular flange 17 which forms a part of housing 12.

Housing 16 is divided into compartments 18 and 19 by means of the intermediate partition 20 therein so that compartment 18 has substantially one-half the volume of compartment 19 by way of illustration.

Housing 16 which is adapted for vertical reciprocal movement within housing 12 has joined thereto the flexible conduit 21 whose inner end is suitably joined to the partition 20 in registry with opening 22 therethrough, providing fluid communication at the lower end of and within compartment 18 which forms the upper part of housing 16.

The other end of conduit 21 extends loosely thru the lower open end of compartment 19, and through a corresponding opening in the outer housing 12, with its outer end 23 joined to the two-way valve 24, diagrammatically shown. Valve element 24 has a passage 25 therein whose outer end is adapted for communication either with the fluid 11 or upon rotation thereof is adapted for communication with fluid delivery pipe 26, for supplying fluid as for instance for purposes of irrigation, by way of illustration.

Two-way valve 24 is normally controlled manually or mechanically for providing fluid communication between delivery pipe 26 and the interior of compartment 18, or on the other hand between compartment 18 and the body of fluid 11.

A second flexible pipe or conduit 27 with hand valve 28 is adapted for connection at its outer end to a source of compressed air or other gaseous substance, while its other end is joined to the partition 20 within housing 16 in registry with opening 29 therethrough, providing communication to the interior of compartment 19, which forms a part of housing 16.

*Operation*

The operation of the above described apparatus is respectively shown in Figures 1, 2, 3, and 4, of the drawings, illustrating various relative positions of housings 16 and 12 under varying conditions.

In Figure 1 valve 14 is open providing fluid communication to the interior compartment 15 of housing 12 whereby the fluid therein is at the same level as the body of fluid 11. At the same time the two-way valve 24 is so adjusted as to provide fluid communication between the body of fluid 11 and the interior of compartment 18 in housing 16, so that the latter is completely submerged within the fluid in housing 12, and with hand valve 28 preferably closed, or at least with said conduit 27 disconnected from the source of compressed air or other gas.

Figure 2:
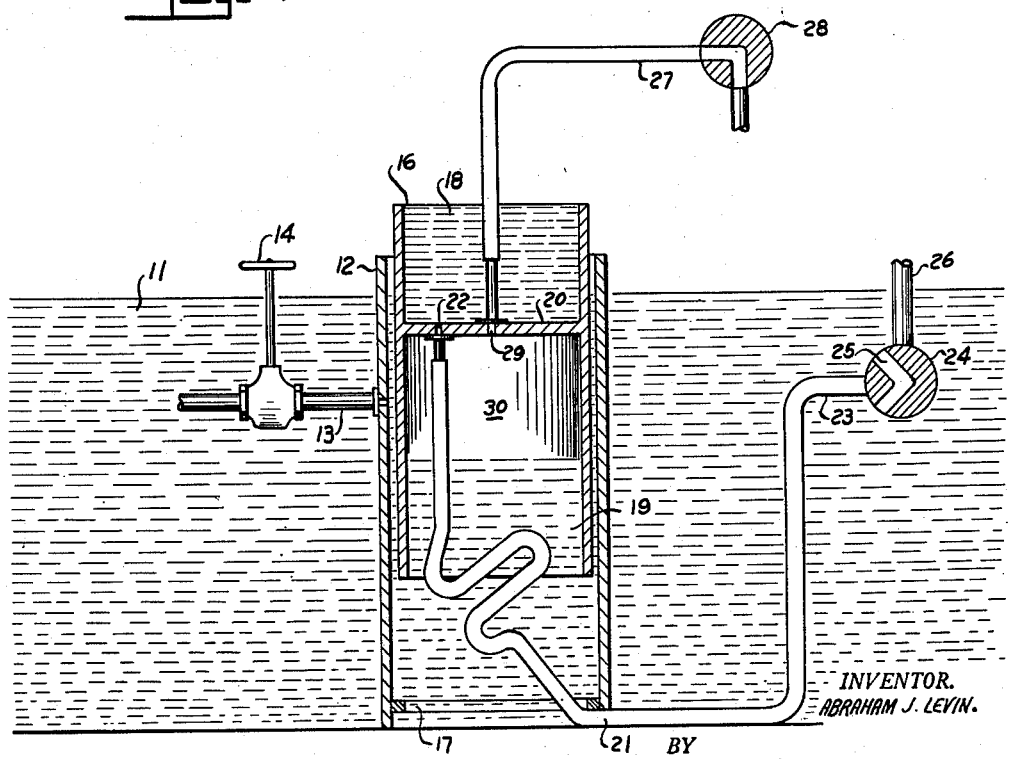
Figure 2 is a similar view illustrating the relative position of the elements under a change of conditions.

As the first step in the operation of the above apparatus valve 24 is closed to effectively close off fluid communication thru conduit 21, as illustrated in Figure 2.

The hand valve 28 is momentarily opened providing the inlet of compressed air into the lower compartment 19 of housing 16, said body of air being entrapped below partition 20, and designated by the numeral 30, Figure 2, and which causes housing 16 to rise upwardly within housing 12 to the position shown in Figure 2, and with the fluid within the upper compartment 18 of housing 16 being elevated to the position shown.

Thus an artificial pressure head has been created for this fluid, with housing 16 and its partition 20 being supported by the entrapped cylindrical body of compressed air 30.

The introduction of compressed air into compartment 19 which is interposed between the fluid therein and partition 20 is one means of artificially creating a reserve buoyancy for the inner housing 16 causing the same to attain the upright floating position within the body of fluid 11, and more particularly within housing 12 which serves essentially as a guide therefor.

In Figure 1 it is clear under principles of buoyancy that the combined weight of housing 16 and the fluid in compartment 18 is in excess of the weight of the fluid displaced by container 16 so that initially said container is completely submerged as illustrated in Figure 1.

However as described with respect to Figure 2 a reserve of buoyancy has been created by the introduction of the mass of compressed air 30 thereby causing an upward movement of housing 16 within and in respect to housing 12.

The water head of the fluid within compartment 18 has now been increased by its elevation to the position shown in Fig. 2.

Referring now to Fig. 3, the two-way valve 24 is adjusted providing fluid communication between compartment 18 and fluid delivery pipe 26 by means of the interconnecting conduit 21. Due to the pressure head created it is seen that fluid from compartment 18 will now be delivered thru pipe 26 and is available for a multiple of uses, such as for instance the supply of water for irrigation purposes, as well as for various hydrodynamic purposes.

As viewed in Fig. 3 approximately one-half of the fluid has been withdrawn from compartment 18 with result that the total weight of the remaining fluid therein and the weight of housing 16 has decreased. As the compressed air 30 within compartment 19 is unchanged it is clear that the buoyant effect thereof will be increased due to the reduction of said combined weight, and housing 16 will move upwardly substantially to the relative position shown in Fig. 3.

As the fluid continues to flow from compartment 18 it is seen that the combined weight of housing 16 and the fluid within said compartment continually decreases thereby increasing the buoyant effectiveness of the trapped compressed air 30, all the time causing a continual gradual upward movement of compartment 18, thereby maintaining a fluid head for any remaining fluid therein until all of said fluid has been delivered thru pipe 26, at which time housing 16 will be in a position shown in Fig. 4.

As a final step towards completion of the cycle of operation hand valve 28 is opened permitting the escape of the entrapped air 30 to the atmosphere, said valve 28 being so constructed as to permit escape of said air in one position of adjustment and to permit the introduction of compressed air thru pipe 27 when in a second position of adjustment.

With the air pocket 30 eliminated, the inner housing element 16 will drop to the dotted line position indicated in Fig. 4 so that the bottom of compartment 18 will be slightly below the surface of fluid 11.

With the two-way valve 24 now turned to the position shown in Fig. 1, fluid will flow therethru and thru conduit 21 and into compartment 18 causing the same to be submerged as indicated in Fig. 1. At this point it is noted that compartment 18 has been refilled and it is only necessary to again create the reserve buoyancy above described with respect to housing 16 to thereby cause its initial relative movement to the position shown in Fig. 2.

Thus a satisfactory mechanism has been provided for creating an artificial water pressure head for the delivery of fluid thru the pipe 26 for multiple purposes as for instance for irrigation, and on the other hand the control of said reserve buoyancy is effective for regulating the movements of housing 16 relative to outer housing 12.

A slight variation of the invention is shown in Figs. 5 and 6 in conjunction with the relative positioning of the housing 12 and 16 of Figs. 1 and 2. As shown in Figs. 5 and 6 the conduit 21 has been joined at its outer end to a two-way valve 24, which in one position thereof is in communication with fluid intake pipe 13 to housing 12.

In the initial operation the housings 12 and 16 assume the relative positions shown in Figs. 1 and 2, it being noted in Fig. 2 that hand valve 24 has closed off the flow of fluid thru conduit 21.

Fig. 2 illustrates the relative elevated position of housing 16 by virtue of the entrapped column of compressed air 30, however conduit 21 has now been joined to fluid intake pipe 13 in the manner illustrated in Fig. 5.

When the 2-way valve 24 is operated to the position shown in Fig. 5 the fluid in compartment 18 is adapted to flow therethrough and into the interior of housing 12 causing the latter to fill with fluid, or cause the introduction of fluid thereinto effecting a rise in the fluid level in housing 12 above the level of liquid 11, whereby a quantity of fluid may be stored under a fluid head.

As shown in Fig. 5, substantially one-half of the fluid has flowed thru conduits 21 and 13 whereby the buoyant effect of the entrapped air 30 has been increased due to the decrease in weight of container 16 and the remaining fluid within compartment 18. Consequently housing 16 will have moved upwardly from the position shown in Fig. 2 thereby maintaining or increasing the fluid pressure head of the fluid remaining in compartment 18 causing the same to continue to flow outwardly thru pipes 21 and 13.

In the final stage shown in Fig. 6 the apparatus has functioned so that all the fluid has been delivered from compartment 18 out thru the conduits 21 and 13, at which point the buoyant effectiveness of the entrapped air 30 is at its maximum, to maintain housing 16 at its highest position. Throughout the delivery of fluid from chamber 18 said fluid flowing thru conduits 21 and 13 has increased the amount of fluid in housing 12 which may be used for any number of purposes other than the mere overflow from the top of housing 12. Said additional fluid will rise and be stored above the normal fluid level of housing 12 and may be delivered, if desired, thru valve 31 in outlet pipe 32.

It is contemplated that the increased fluid within housing 12 will assist the upward movement of housing 16 if the same is permitted to accumulate within housing 12.

Thus it is seen that the construction shown in Figs. 5 and 6 provides certainly a relative hydraulically controlled movement between movable housing 16 and the body of fluid 11, and particularly movement of said housing with respect to the outer guiding housing 12.

As shown in Fig. 6 with all the fluid drained from compartment 18 hand valve 28 may be opened to permit the escape of compressed air 30, and housing 16 will drop to the fragmentary dotted line position shown in Fig. 6, which it will be noted places the bottom partition wall part of compartment 18 slightly below the water level 11.

The two-way valve 24 may now be adjusted to provide fluid communication between said body of fluid 11 and conduit 21 so that fluid will begin to flow back thru said conduit and into chamber 18 inasmuch as the fluid level of the body of fluid 11 is above the inlet opening 22 to said compartment; furthermore compartment 18 will gradually fill with fluid, and as it does so housing 16 will gradually become submerged to the relative position shown in Fig. 1 to complete the cycle of operation.

In connection with Figs. 4 and 6 it was explained that valves 28 are adapted to permit the escape of air 30 thru pipe 27. It may not be necessary to permit the escape of all the air 30, but just a sufficient amount as will permit the fall of container 16, with the remaining shortened column of air 30 being partially compressed.

It is contemplated that the compressed air which is permitted to escape may be utilized, if desired, for a useful purpose.

Drain pipe 21 is shown as the preferred means for delivering fluid from compartment or chamber 18, Fig. 2, however it is contemplated that said fluid may be siphoned therefrom if desired.

As above described in the preferable embodiment herein a source of compressed air is employed to create a reserve buoyancy. It is contemplated however that other means may also be employed for creating this reserve buoyancy, as for instance a weight and pulley, a lever, or other mechanical means, adapted to so upset the initial equilibrium of fluid as to cause container 18 with a quantity of fluid therein to be elevated above the normal level of fluid 11.

The above description of element 16 refers to elements 18 and 19 as compartments. The claims set out hereinafter specify compartment 18 as an upper supply chamber or an upper chamber, with compartment 19 being specified in said claims as the lower chamber.

While said reserve buoyancy may be created by the operation of a weight and pulley, a lever, or other mechanical means, as above referred to, it follows further that the release of said weight, pulley, lever or other mechanical means would correspond to the release of air from chamber 19, to thereby decrease said reserve buoyancy.

Having described my invention, reference should now be had to the following claims for determining the scope thereof.

I claim:

1. In combination, a hollow upright housing substantially immersed in a fluid body, a valve means thereon providing fluid communication with its interior, a second open-ended partitioned housing movable therein having an upper fluid supply chamber and a lower chamber, a compressed air supply conduit in communication with said lower chamber, valve means in said conduit for controlling the flow of compressed air to said lower chamber for entrapping a column thereof within said chamber to develop a reserve buoyancy in said second housing, causing the same to rise in said first housing above the level of fluid therein creating a head for the fluid in said supply chamber, a fluid conduit in communication at one end with the lower end of said supply chamber and with its outlet extending above said fluid body, and a two-way valve in said conduit normally providing for the delivery of fluid through said outlet from said supply chamber and adapted to alternately establish fluid communication between said supply chamber and said fluid body.

2. In combination, an open-ended upright partitioned housing immersed in a fluid body and having an upper fluid supply chamber and a lower chamber, a compressed air supply conduit in communication with said lower chamber, valve means in said conduit controlling the flow of air to said lower chamber for entrapping a column of air therein to develop a reserve buoyancy in said housing causing the same to rise in said fluid above the level thereof and creating a head for the fluid in said supply chamber, a fluid conduit joined to said supply chamber, and having an outlet extending above said fluid body, and a two-way valve in said conduit normally providing for the delievery of fluid through said outlet from said supply chamber and adapted to alternately establish fluid communication between said supply chamber and said fluid body.

3. In combination, an open-ended upright partitioned housing immersed in a fluid body and having an upper fluid supply chamber and a lower chamber, a compressed air supply conduit in communication with said lower chamber, valve means in said conduit for controlling the flow of air to said lower chamber for entrapping a column of air therein to develop a reserve buoyancy in said housing causing the same to rise in said fluid above the level thereof and creating a head for the fluid in said supply chamber, a fluid conduit joined to said supply chamber and having an outlet extending above said fluid body, a two-way valve in this conduit normally providing for the delivery of fluid through said outlet from said supply chamber and adapted to alternately establish fluid communication between said supply chamber and said fluid body, and upright guide means in said fluid body within which said housing is axially movable.

4. In combination, an open-ended upright partitioned housing immersed in a fluid body and having upper and lower chambers, a compressed air supply conduit in communication with said lower chamber, valve means in said conduit controlling the flow of air thereto for entrapping a column of air therein to develop a reserve buoyancy in said housing causing the same to rise in said fluid above its level and creating a head of fluid in said upper chamber, a fluid conduit joined to said upper chamber and having an outlet extending above said fluid body, and valve means in said fluid conduit for controlling the delivery of fluid therethrough from said upper chamber and alternately adjustable to establish fluid communication between said upper chamber and said fluid body, said reserve buoyancy increasing as fluid is withdrawn from its upper chamber and delivered through said outlet causing continued upward movement thereof to increase the head of the remaining fluid in said upper chamber.

5. In combination, an open-ended upright partitioned housing immersed in a fluid body and having upper and lower chambers, a compressed air supply conduit in communication with said lower chamber, valve means in said conduit controlling the flow of air thereto for entrapping a column of air therein to develop a reserve buoyancy in said housing causing the same to rise in said fluid above its level and creating a head of fluid in said upper chamber, a fluid conduit joined to said upper chamber at one end with its other end having an outlet positioned above said fluid, and valve means in said fluid conduit for controlling the delivery of fluid therethrough and adapted to alternately establish communication between said upper chamber and said fluid body, said reserve buoyancy increasing as fluid is withdrawn from said upper chamber and delivered thru said outlet causing continued upward movement thereof to increase the head of the remaining fluid in said upper chamber, the valve means in said air conduit being adjustable to regulate the escape of air from said lower chamber decreasing said reserve buoyancy and causing said upper chamber to descend in said fluid body.

6. In combination, an open-ended upright partitioned housing immersed in a fluid body and having upper and lower chambers, a compressed air supply conduit in communication with said lower chamber, valve means in said conduit controlling the flow of air thereto for entrapping a column of air therein to develop a reserve buoyancy in said housing causing the same to rise in said fluid above its level and creating a head of fluid in said upper chamber, a fluid conduit joined to said upper chamber at one end with its other end having an outlet above said fluid body, and valve means in said fluid conduit for controlling the delivery of fluid therethrough, said reserve buoyancy increasing as fluid is withdrawn from said upper chamber causing continued upward movement thereof to increase the head of the remaining fluid in said chamber, the valve means in said air conduit being adapted to regulate the escape of air from said lower chamber decreasing said reserve buoyancy and causing said upper chamber to descend in said fluid, the valve means in said fluid conduit being adjustable to establish communication between said fluid and said upper chamber causing said housing to be immersed as said chamber refills.

ABRAHAM J. LEVIN.

REFERENCES CITED

The following references are of record in the file of this patent:

UNITED STATES PATENTS

| Number | Name | Date |
| --- | --- | --- |
| 298,990 | Leedy | May 20, 1884 |
| 1,300,866 | Pennington | Apr. 15, 1919 |

FOREIGN PATENTS

| Number | Country | Date |
| --- | --- | --- |
| 1,929 | Great Britain | 1792 |